United States Patent
Xie et al.

(10) Patent No.: US 11,053,122 B2
(45) Date of Patent: Jul. 6, 2021

(54) CONTINUOUS COMBUSTION PRODUCTION EQUIPMENT FOR SYNTHESIZING TON-GRADE FULLERENES AND A SYNTHETIC PROCESS THEREFOR

(71) Applicants: Xiamen University, Xiamen (CN); Jiangxi Jinshi High-tech Development Co., Ltd., Jiangxi (CN)

(72) Inventors: Suyuan Xie, Xiamen (CN); Chaoyong Fu, Xiamen (CN); Miaomiao Chen, Xiamen (CN); Guoyuan Wang, Xiamen (CN); Xiaoming Tong, Xiamen (CN); Jun Xiao, Xiamen (CN); Shunliu Deng, Xiamen (CN); Qianyan Zhang, Xiamen (CN)

(73) Assignees: XIAMEN UNIVERSITY, Xiamen (CN); JIANGXI JINSHI HIGH-TECH DEVELOPMENT CO., LTD., Jiangxi (CN)

( * ) Notice: Subject to any disclaimer, the term of this patent is extended or adjusted under 35 U.S.C. 154(b) by 0 days.

(21) Appl. No.: 16/722,733

(22) Filed: Dec. 20, 2019

(65) Prior Publication Data
US 2020/0198972 A1    Jun. 25, 2020

(30) Foreign Application Priority Data
Dec. 24, 2018 (CN) .............................. 201811583650

(51) Int. Cl.
*C01B 32/154*   (2017.01)
(52) U.S. Cl.
CPC ................................. *C01B 32/154* (2017.08)

(58) Field of Classification Search
CPC ...... C01B 32/154; C01B 32/16; C01B 32/164; B82Y 40/00; Y10S 423/39; Y10S 977/734; B01J 19/26; F23D 14/48; F23D 14/58
See application file for complete search history.

(56) References Cited

FOREIGN PATENT DOCUMENTS

| CN | 101012056 | 8/2007 |
|---|---|---|
| CN | 101503188 | 8/2009 |
| CN | 102629856 | 8/2012 |

OTHER PUBLICATIONS

English machine translation of CN101012056A.*
(Continued)

*Primary Examiner* — Richard M Rump
(74) *Attorney, Agent, or Firm* — Wenderoth, Lind & Ponack, L.L.P.

(57) ABSTRACT

A continuous combustion production equipment for synthesizing ton-grade fullerenes and a synthetic process therefor. The continuous combustion production equipment is equipped with a gas supply and flow control system, a liquid supply and flow control system, a vaporization and preheating system, a combustion furnace, a combustor, a spray nozzle, an ignition system, a filter tank, a product collection system, a vacuum control system, a vacuum measuring and displaying unit and a circulation water cooling system. Opening the supply line of gas fuels, arranging the tip of a metal electrode of the ignition system near the gas fuel outlet of the combustor, opening the ignition system, igniting the gas with an electric spark to generate a flame; initiating the vacuum pump set; opening the supply line of liquid raw materials, adjusting to a suitable flux with a constant flow pump; adjusting the pressure of the system to keep it below 5000 Pa.

20 Claims, 3 Drawing Sheets

(56) References Cited

OTHER PUBLICATIONS

English machine translation of CN101503188B.*
English machine translation of CN10101256 (2007).*
English machine translation of CN101503188 (2009).*
Howard et al., "Fullerenes $C_{60}$ and $C_{70}$ in flames", Letters to Nature, vol. 352, pp. 139-141, 1991.
Lee et al., "Synergistic effect on soot formation in counterflow diffusion flames of ethylene—propane mixtures with benzene addition", Combustion and Flame, vol. 136, pp. 493-500, 2004.

* cited by examiner

CONTINUOUS COMBUSTION PRODUCTION EQUIPMENT FOR SYNTHESIZING TON-GRADE FULLERENES AND A SYNTHETIC PROCESS THEREFOR

TECHNICAL FIELD

The disclosure relates to fullerenes, specifically relates to a combustion equipment for synthesizing ton-grade fullerenes by means of diffusive combustion and a synthetic process therefor.

BACKGROUND

Fullerene is the third allotropic form of carbon in addition to graphite and diamond, which had become the research hotspot for its unique hollow spherical cage structure and physicochemical characteristics such as strong electron affinity and the like since be found in 1985. Fullerene has great application potential and value in fields of solar cell, catalysis, and bio-medicine. The development and application of fullerenes are of great significance to the progress of science and technology, and enhancing the productivity of fullerenes and reducing the production cost of fullerenes became the key for the achievement of better application and faster development.

The synthetic processes of fullerene primarily include laser evaporation graphite method, resistance heating evaporation graphite method, graphite arc discharge method, flame combustion method, aromatics pyrolysis, plasma method and organic synthesis, etc. Currently, processes for the industrial production of fullerenes mainly are the flame combustion method and the graphite arc discharge method, both of which are the synthetic reactions of fullerenes under low pressure. Compared to preparing fullerenes with the graphite arc discharge method, there were the following advantages in preparing fullerenes with the flame combustion method: the raw materials were low in cost and may be supplied continuously; the proportion of ingredients in the product may be adjusted by regulating the flame conditions; there was no power consumption during the combustion.

The combustion modes in the flame combustion method were primarily premixed combustion (Howard, J. B., et al. "Fullerenes $C_{60}$ and $C_{70}$ in flames." Nature 352.6331 (1991): 139-141.) and diffusive combustion (Lee, S. M., et al. "Synergistic effect on soot formation in counterflow diffusion flames of ethylene-propane mixtures with benzene addition," Combustion & Flame 136.4 (2004): 493-500.). Premixed combustion refers to a combustion mode in which the fuels and the oxidizing agents are mixed uniformly first, then charged into the combustion equipment. While diffusive combustion refers to a combustion mode, in which the fuels and the oxidizing agents are released from their separate channel, contact with each other by diffusion and burn when excited by energy, the mixing process is conducted accompanied with the combustion process. The combustion efficiency of premixed, combustion is higher, while premixed combustion would burn out when the gas flow rate is high and it is difficult to ignite, and tempering may occur, causing the risk of deflagration. Therefore, the anti-fluctuation capability of the premixed combustion system is poor; while the diffusive combustion is relatively safe and steady, easy to manipulate, and more benefit for industrialized synthesis safely and steadily.

The combustion furnace and the product collection system are critical components for the achievement of continuously and steadily production of fullerenes by combustion processes. Direct products of combustion are the carbon ashes containing fullerene ingredients, which would gradually accumulate in the combustion equipment during the production process. On the one hand, the inner space of the combustion equipment is limited and equipped with some parts, the excessive accumulation of carbon ashes would influence the normal and continuous operation of the equipment directly; on the other hand, the carbon ashes may be considered as "combustible dust", the excessive accumulation of which would lead to safety hazards. Therefore, in the equipment and synthetic processes for the mass continuous production of fullerenes, transferring the carbon ashes from the combustion chamber to the collection unit promptly and continuously and collecting the carbon ashes uninterruptedly are key parts for guaranteeing the mass and continuous production of fullerenes, and it would be of important significance for the safe, steady and continuous operation of the equipment.

The processing equipment disclosed in Chinese patent CN101012056A was made of glass, with a safety risk that the glass was prone to burst, and the production was low; the processing equipment disclosed in Chinese patent CN101503188 was made of stainless steel, while the combustion must be stopped when collecting the products, thus being incapable of achieving the continuous synthesis; the processing equipment disclosed in Chinese patent CN201210123308 was capable of achieving the continuous production of fullerenes, while because of the unbalanced pressure when switching the collection systems, there would be problems in the stability of continuous production, and the conversion rate of fullerenes synthesized by combustion was low.

SUMMARY

The object of the disclosure is to provide a continuous combustion production equipment for synthesizing ton-grade fullerenes by means of diffusive combustion and a synthetic process therefor.

The continuous combustion production equipment for synthesizing ton-grade fullerenes is equipped with a gas supply and flow control system, a liquid supply and flow control system, a vaporization and preheating system, a combustion furnace, a combustor, a spray nozzle, an ignition system, a filter tank, a product collection system, a vacuum control system, a vacuum measuring and displaying unit and a circulation water cooling system;

the combustion furnace is placed vertically, on the wall of which are arranged a water-cooling interlayer and at least 1 viewing window, the combustion furnace is an all-in-one diffusion combustion furnace, the inner of the all-in-one diffusion combustion furnace is a three-stage diffusion structure, the three-stage diffusion structure refers to a three-stage variable diameter structure with the inner diameter increasing progressively inside the combustion furnace, which was built up with lining thermal insulation materials of different thicknesses;

the combustor is equipped with three gas passages respectively at the inner, middle and outer layer, the cross sections of each gas passage are concentric circles (circular rings), the gas passages are arranged as variable diameter passages, the outlets of the gas passages maybe not in the same section; the combustor is equipped with a water-cooling interlayer, the combustor extends into the combustion furnace through the top cover with the minimum inner diameter, and its center line coincides with the center line of the combustion furnace basically, the flame direction in combustion is in line with the low pressure flow direction;

the spray nozzle is arranged in the inner side of the combustion furnace, the ejection direction of the spray nozzle is pointed at the flame, the flux of gas raw materials is controlled with the flowmeter in the gas supply and flow control system, the flux of liquid raw materials is controlled with a constant flow pump in the liquid supply and flow control system; the raw material supply line in the gas and liquid supply system is heated with the heating components, the heating temperature is controlled with a temperature controller in the vaporization and preheating system, i.e., the gas raw materials and liquid raw materials are preheated prior to being charged into the combustion furnace;

the ignition system is equipped with a sleeve, a boost circuit and 2 metal electrodes, with the sleeve together with, the metal electrodes placed inside the sleeve extending into the combustion furnace, one side of the 2 metal electrodes is the tip, the other side of the 2 metal electrodes is connected with the boost circuit;

the filter tank is placed horizontally, the inlet of the filter tank is connected with the outlet of the combustion furnace through an elbow pipe and a three-way ball valve (a first valve), the filter tank is equipped with a filter cartridge and a product sweeping device, the carbon ashes in the filter tank and on the filter cartridge are swept into a product collection, system by a product sweeping device without changing the pressure of the reaction system; at least 2 filter tanks are arranged so that each filter tank can switch to each other to achieve continuous production;

the product collection system includes product collection tanks and a bag collection equipment, the structure of the bag collection equipment is substantially the same as that of the bag filter for dusty gas commonly used in the industry; the product collection tanks are arranged under the two ends of the filter tank, with each at the left and the right, there is a second valve arranged between each product collection tank and the filter tank, the product collection tanks are equipped with ports with switches for transferring the products to the bag collection equipment; the bottoms of the 2 filter tanks are connected with the product collection tank, each product collection tank is connected with the first vacuum pump set through the pipeline and the bag collection equipment, there is a third valve arranged in the pipeline;

the product sweeping system is equipped with a metal hoop, the plane of the metal hoop is parallel to the endcap of the filter tank, the metal hoop is surrounded with brushes made of copper wires, an electric motor arranged outside the filter tank controls the front-to-back motion of the metal hoop in the filter tank through gear wheels and screws;

there is a valve in communication with air arranged on the pipeline of the vacuum pump set (the first vacuum pump set) in the vacuum control system, through which valve the pressure in the combustion furnace may be controlled in a certain range; the outlet of the filter tank is connected with the first vacuum pump set through pipelines, there are valves arranged in the pipelines; the filter tank is connected with the combustion furnace and the vacuum pump set in the same way; the combustion furnace, the filter tank and the product collection tank are connected with the vacuum measuring and displaying unit, the vacuum measuring and displaying unit is used for monitoring the internal pressures in the combustion furnace, the filter tank and the product collection tank;

the circulation water cooling system is connected with the combustion furnace and the vacuum pump set, which is used for circulation supplying cooling water to the combustion furnace and the vacuum pump set.

The gas raw materials include gas fuels and oxygen, wherein the gas fuels include, but not limited to, acetylene, methane, natural gas, etc.; the liquid raw materials are various hydrocarbons or mixtures thereof, the hydrocarbons include, but not limited to, benzene, cyclopentadiene, coal tar, etc.

The fullerenes include various fullerenes contained in the carbon ashes, including C70, C70, C84 fullerenes and derivatives thereof as well as the bowlic compounds, open-cage fullerenes, which are the intermediates of fullerene reaction.

The continuous combustion production process for synthesizing ton-grade fullerenes includes the following steps:

1) opening the supply line of gas fuels (Note: gas raw materials include the fuels and oxygen, only supplying the fuels here), adjusting to a suitable flux with a mass flow meter, placing the tip of the metal electrode of the ignition system near the gas fuel outlet of the combustor, opening the ignition system, igniting the gas with an electric spark to generate a flame;

2) initiating the vacuum pump set, opening the valves between the filter tank and the vacuum pump set, between the filter tank and the combustion furnace, meanwhile opening the oxidizing agent gas supply line, adjusting to a suitable flux with a flowmeter, initiating the circulation water cooling system;

3) opening the supply line of liquid raw materials, adjusting to a suitable flux with a constant flow pump; the liquid raw materials are heated and vaporized after being charged into the heater in the vaporization and preheating system, after vaporization, they are charged into the combustor through the pipeline, then be sprayed into the combustion region to participate in the combustion;

in step 3), the setting temperature of the heater may be 200-500° C. higher than the boiling point of liquid raw materials.

4) opening the supply line of liquid raw materials, adjusting to a suitable flux with a constant flow pump; the liquid raw materials are charged into the spray nozzle through the pipeline, then be sprayed into the flame to participate in the combustion;

5) adjusting the pressure of the system to keep it below 5000 Pa; at some interval of time, conducting the following steps successively:

6-1) initiating the electric motor outside the filter tank, driving the metal hoop to move front-to-back in the combustion furnace through gear wheels and screws, sweeping solid products in the filter tank into the product collection tank under the filter tank;

6-1) closing the second valve between the product collection tank under the filter tank and the filter tank, transferring the products in the product collection tank to the bag collection equipment;

6-3) initiating the second vacuum pump connected with the product collection tank, making the pressure in the product collection tank close to the pressure in the combustion furnace, closing the second vacuum pump;

6-4) opening the second valve between the product collection tank under the filter tank and the filter tank.

After step 5), at some interval of time, conducting the following steps successively:

7.1) closing the first valve between one filter tank and the combustion furnace, and the third valve between the filter tank and the vacuum pump set;

7-2) transferring the products in the product collection tank under the filter tank to the bag collection system;

7-3) initiating the second vacuum pump connected with the filter tank and the product collection tank, making the pressure in the product collection tank close to the pressure in the combustion furnace, closing the second vacuum pump;

7-4) opening the first valve between the filter tank and the combustion furnace, and the third valve between the filter tank and the vacuum pump set;

7-5) conducting the operations described in steps 7-1) to 7-4) on all the filter tanks successively.

The disclosure has the following advantages:

(1) By means of diffusive combustion, the anti-interference and anti-fluctuation capabilities of the system became stronger, and the synthetic process became safer and more stable;

(2) Gas fuels (acetylene, ethylene, etc.) and liquid fuels (benzene, coal tar, etc.) were collectively used as the fuels, and gas fuels were preheated, liquid fuels were heated to be vaporized, so that the solid combustion products contain a variety of fullerenes, fullerene hydrides as well as fullerene derivatives, of which many components have important research and application value;

(3) The three-stage diffusion combustion furnace of the disclosure, the size of inner diameter increases with the distance to the combustor increasing, so that the combustion reaction is beneficial for the nucleation, growth and stabilization of fullerenes with different temperature zones and environmental changes;

(4) There is a product sweeping device arranged in the filter tank of the disclosure, which could collect the combustion products steadily without influencing the pressure of the reaction system, thus achieving the purpose of continuous and stable synthesis;

(5) The combustion furnace of the disclosure is placed vertically, when combustion at low pressure, the flame direction extends downward with the low pressure flow direction, thus avoiding the accumulation of combustion products in the combustion furnace due to the effects of gravity and the vacuum pump, and guaranteeing the industrialized synthesis of ton-grade fullerenes;

(6) There are multiple outlets for raw materials (the outlet of the combustor, the outlet of the spray nozzle, etc.) arranged on the combustion furnace of the disclosure, which are convenient for adding more ingredients in the raw materials, thus getting combustion products containing more kinds of components;

(7) By use of the combustion equipment and synthetic process of the disclosure, the annual output of fullerenes may reach ton-grade.

BRIEF DESCRIPTION OF THE DRAWINGS

In FIG. 3, the horizontal ordinate is the time (Time, min), the vertical ordinate is the mass spectrometry ionic strength (Intens, $\times 10^6$), the peak at 38.7 min responds to the fullerene hydride $C_{50}H_{10}$, the peak at 85.6 min responds to the fullerene derivative $C_{60}$ ($C_5H_6$), the peaks at 91.8 min and 108.8 min respond to fullerene $C_{60}$ and $C_{70}$ respectively.

DESCRIPTION OF THE EMBODIMENTS

The disclosure will be further illustrated in the following embodiments in conjunction with the accompanying figures.

Figure 1:
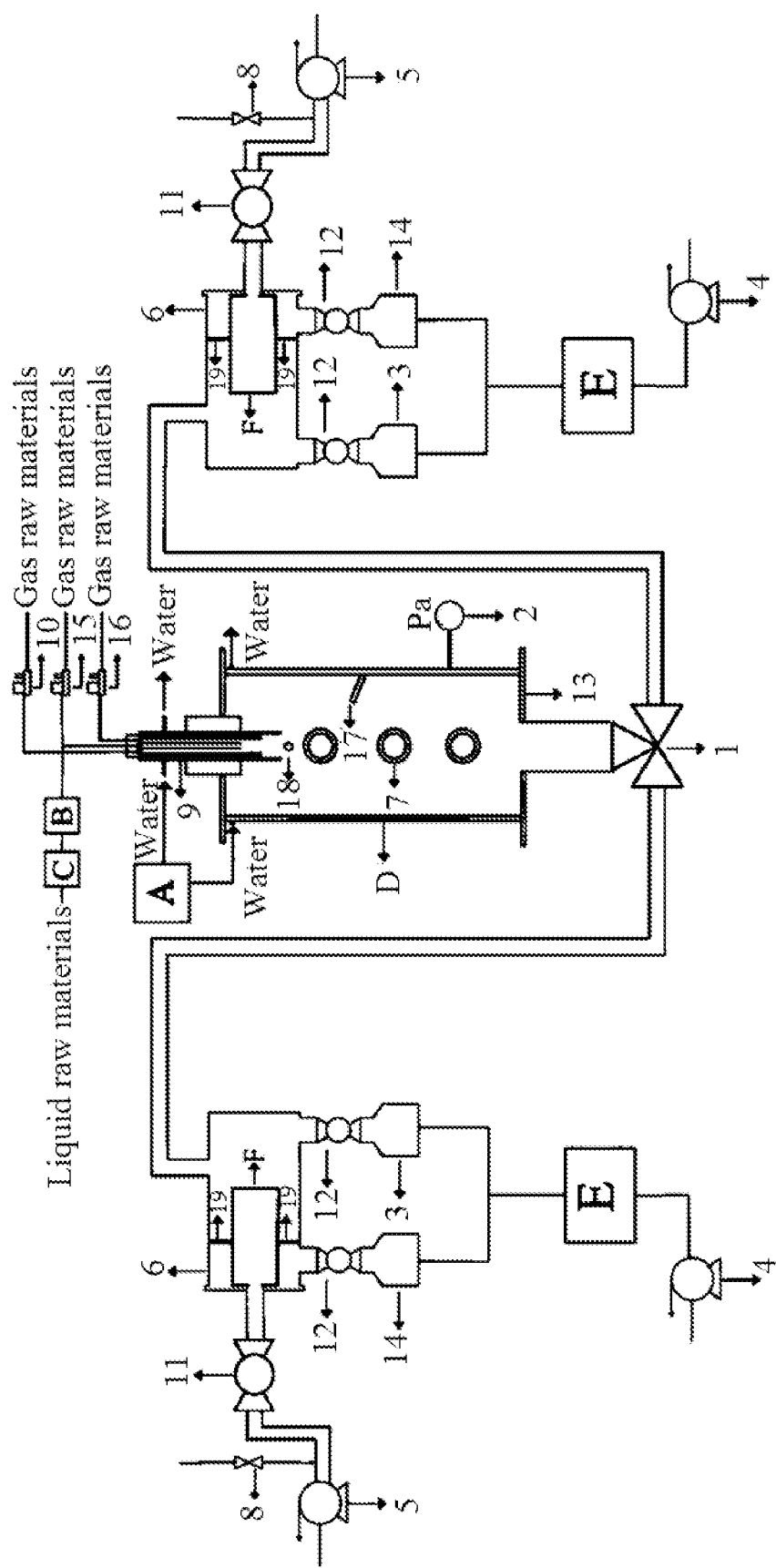
FIG. 1 is the first schematic diagram of embodiments of the combustion equipment for synthesizing ton-grade fullerenes of the disclosure.
Figure 2:
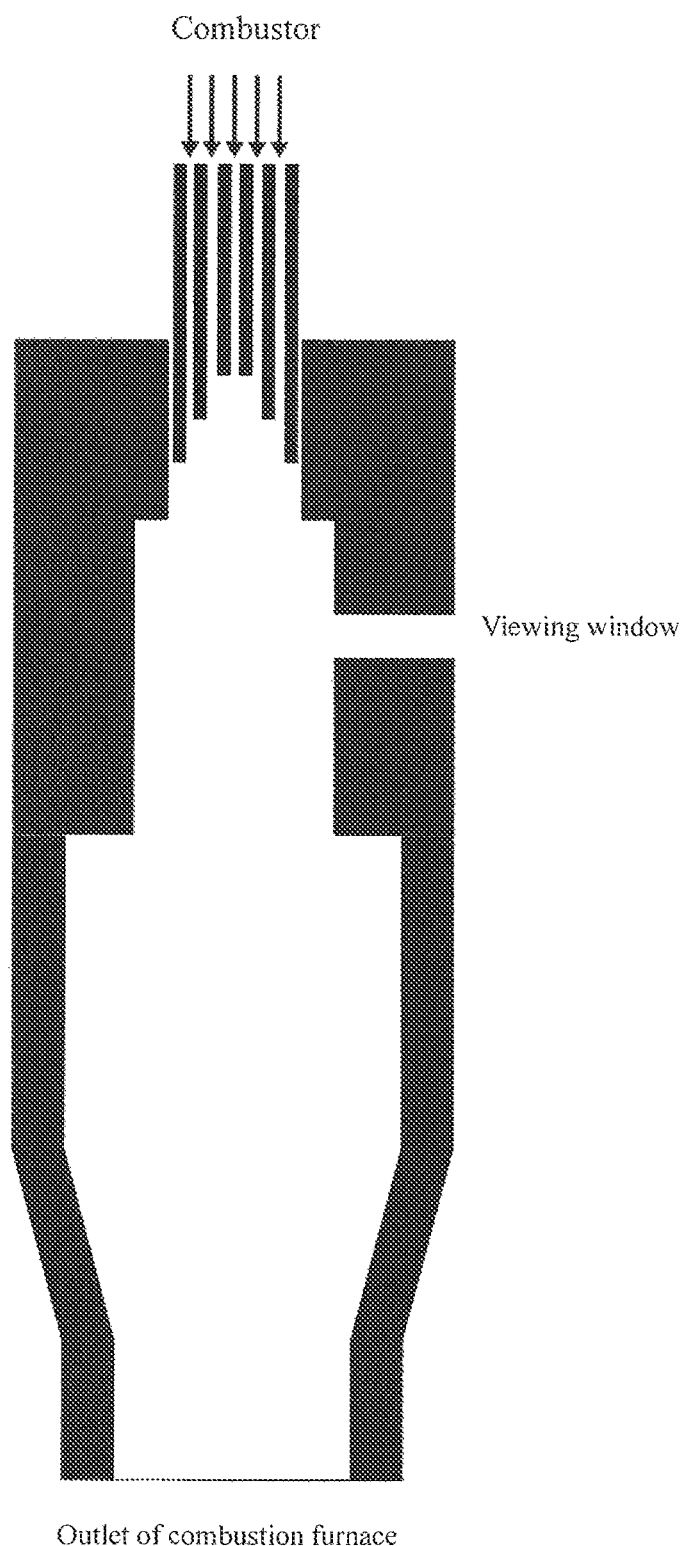
FIG. 2 is the second schematic diagram of embodiments of the combustion equipment for synthesizing ton-grade fullerenes of the disclosure.
Figure 3:
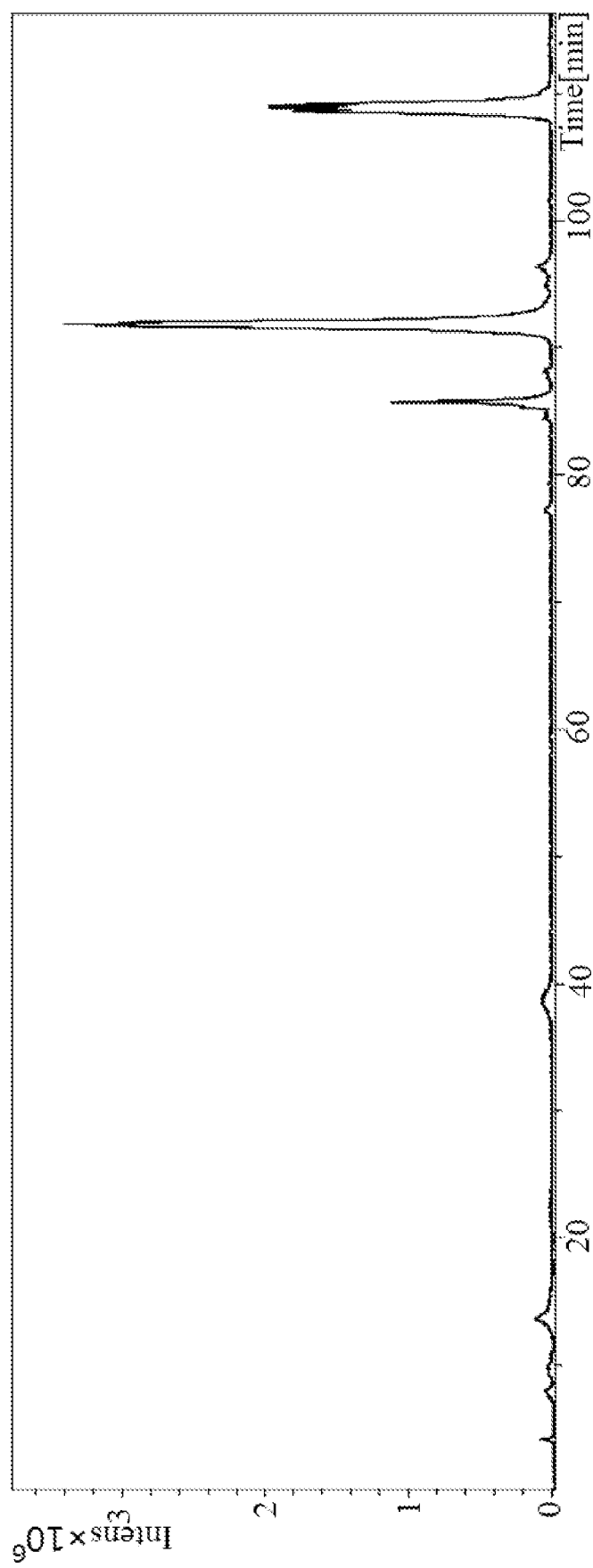
FIG. 3 is the base peak diagram for liquid chromatography-mass spectrometry of the basic extract of the solid combustion products synthesized in the embodiments of the disclosure.

Embodiment 1. An equipment for synthesizing fullerenes by a combustion process, as shown in FIG. 1, includes a gas supply and flow control system, a liquid supply and flow control system, a vaporization and preheating system, a vacuum control system, an ignition system, a combustor, a combustion furnace, a spray nozzle, a vacuum measuring and displaying unit, a product sweeping system, a filter tank, a circulation water cooling system and a product collection tank.

The flow of gas raw materials was controlled with the first flowmeter 10, the second flowmeter 15, and the third flowmeter 16; the flow of liquid raw materials was controlled with the constant flow pump B, and heated and vaporized with the heater C, the setting temperature of which was far higher than its boiling point. Gas raw materials and liquid raw materials were charged into the combustor 9 through the pipeline (the pipeline was wound with heating tapes for preheating treatment on the raw materials), and sprayed out with the combustor 9 to participate in the combustion. The combustor 9 was of a multi-layer sleeve structure, having in total three gas passages respectively at the inner, middle and outer layer, the cross sections of each gas passage are concentric circles (circular rings), there was a water-cooling interlayer arranged in the combustor 9. The combustor 9 extended into the combustion furnace through the top cover 13 of the combustion furnace. There are multiple viewing windows 7 arranged on the combustion furnace. The combustor and the combustion furnace were as shown in FIG. 1, a spray nozzle 17 is arranged in the inner side of the combustion furnace, the ejection direction of which is pointed at the flame. There was arranged a precision vacuum gauge 2 connected to the inside of the combustion furnace. There was water-cooling interlayers arranged both in the combustion furnace and in the furnace cover. There was a filter cartridge arranged inside the filter tank 6, one side of which was connected with the bottom of the combustion furnace through the pipeline, there was a first valve 1 arranged in the pipeline; the other side of the filter tank 6 was connected with the first vacuum pump set 5 through the pipeline, there were a second valve 11 and a fourth valve 8 arranged in the pipeline. The first product collection tank 3 was connected with the bottom of the filter tank 6 through the pipeline, the second product collection tank 14 was connected with the bottom of the filter tank 6 through the pipeline, there was a valve 12 arranged in the pipeline. The first product collection tank 3, the second product collection tank 14 were connected with the second vacuum pump set 4 through the bag collection equipment E. There was a metal hoop 19 arranged inside the filter tank 6, the plane of the metal hoop 19 was parallel to the endcap of the filter tank, the metal hoop 19 was surrounded with brushes made of copper wires, and an electric motor arranged outside the furnace controlled the front-to-back motion of the metal hoop 19 in the filter tank through gear wheels and screws.

Embodiment 2. A process for mass and continuous synthesizing fullerenes, employing the equipment of Embodiment 1, with industrial grade pure oxygen as the oxidizing agent, and with acetylene as the gas fuel, and benzene as the liquid raw material, conducting the following steps successively:

1). opening the supply line of acetylene, adjusting the flux to 35 SLM with the second mass flow meter 15, placing the tip of the metal electrode of the igniter near the acetylene gas outlet of the combustor, opening the igniter, igniting the acetylene with an electric spark to generate a flame;

2). initiating the vacuum pump set, opening the first valve 1, the second valve 11, at the same time opening the supply line of oxygen, adjusting the flux to 15 SLM and 35 SLM respectively with the first mass flow meter 10 and the third mass flow meter 16, initiating the circulation water cooling system;

3). opening the supply line of benzene, adjusting the flux to 30 mL/min with the constant flow pump B, the temperature of the heating device was set at 400° C., which, after vaporization, was charged into the combustor through the pipeline, and then sprayed into the combustion region to participate in the combustion;

4). adjusting the fourth valve 8 to keep the reading of the precision vacuum gauge around 3500 Pa.

At an interval of 2~4 h, conducting the following steps successively:

5). initiating the electric motor outside the filter tank, driving the metal hoop 19 to rotate through screws, sweeping the products in the filter tank into the first product collection tank 3 and the second product collection tank 14 under the filter tank;

6). closing the third valve 12 between the first product collection tank 3, the second product collection tank 14 under the filter tank and the filter tank, transferring the products in the first product collection tank 3 and the second product collection tank 14 to the bag collection equipment E;

7). initiating the vacuum pump 4 connected with the first product collection tank 3, making the pressure in the tank close to the pressure in the filter tank, closing the vacuum pump 4;

8). opening the third valve 12 between the first product collection tank 3, the second product collection tank 14 under the filter tank and the filter tank.

At an interval of 2~4 h, conducting the following steps successively:

9). closing the second valve 11 between the filter tank 6 and the vacuum pump set, closing the first valve 1 between the filter tank and the combustion furnace;

10). taking out the product from the second product collection tank 14 under the filter tank;

11). initiating the vacuum pump 4 connected with the second product collection tank 14, making the pressure in the tank close to the pressure in the combustion furnace, closing the vacuum pump;

12). opening the second valve 11 between the filter tank 6 and the vacuum pump set, opening the first valve 1 between the filter tank 6 and the combustion furnace;

13). conducting the above steps 5), 6), 7), 8), 9), 10), 11), 12) on all the filter tanks.

The output of solid combustion products was about 20 kg/d, the toluene extract of the combustion products contained a variety of fullerenes, fullerene hydrides and fullerene derivatives.

Embodiment 3. The following adaptations were made with respect to Embodiment 2:
In step 3), the liquid fuel was cyclopentadiene;
The remaining were the same as Embodiment 2.

The output of solid combustion products was about 20 kg/d, the toluene extract of the combustion products contained a variety of fullerenes such as $C_{60}$ and $C_{70}$, fullerene hydrides such as $C_{50}H_{10}$ and $C_{64}H_4$, and fullerene derivatives such as $C_{60}$ ($C_5H_6$).

Embodiment 4. The following adaptations were made with respect to Embodiment 2:
In step 1), adjusting the flux to 60 SLM with the second mass flow meter 15;
In step 2), adjusting the flux to 40 SLM and 100 SLM respectively with the first mass flow meter 10 and the third mass flow meter 16;
In step 3), adjusting the flux to 120 mL/m in with the constant flow pump B;
The remaining were the same as Embodiment 2.

The output of solid combustion products was about 50 kg/d, the toluene extract of the combustion products contained a variety of fullerenes such as $C_{60}$ and $C_{70}$, fullerene hydrides such as $C_{50}H_{10}$ and $C_{64}H_4$, and fullerene derivatives such as $C_{60}$ ($C_5H_6$).

Embodiment 5. The following adaptations were made with respect to Embodiment 2:
Adding step 3-2) after step 3): opening the supply line of cyclopentadiene, adjusting the flux to 3 mL/min with the constant flow pump B, spraying to the flame with the spray nozzle to participate in the combustion;
The remaining were the same as Embodiment 2.

The output of solid combustion products was about 3.5 kg/d, the toluene extract of the combustion products contained a variety of fullerenes such as $C_{60}$ and $C_{70}$, fullerene hydrides such as $C_{50}H_{10}$ and $C_{64}H_4$, and fullerene derivatives such as $C_{60}$ ($C_5H_6$).

Embodiment 6. The following adaptations were made with respect to Embodiment 2:
In step 1), adjusting the flux to 70 SLM with the second mass flow meter 15;
In step 2), adjusting the flux to 45 SLM and 115 SLM respectively with the first mass flow meter 10 and the third mass flow meter 16;
In step 3), adjusting the flux to 130 mL/min with the constant flow pump B;
The remaining were the same as Embodiment 2.

The output of solid combustion products was about 60 kg/d, the toluene extract of the combustion products contained a variety of fullerenes such as $C_{60}$ and $C_{70}$, fullerene hydrides such as $C_{50}H_{10}$ and $C_{64}H_4$, and fullerene derivatives such as $C_{60}$ ($C_5H_6$).

Embodiment 7. The following adaptations were made with respect to Embodiment 2:
In step 3), the setting temperature of the heating device was 550° C.;
The remaining were the same as Embodiment 2.

The output of solid combustion products was about 2 kg/d, the content of fullerenes in the toluene extract of the combustion products was obviously enhanced compared to the content of fullerenes in the toluene extract of the combustion products in Embodiment 2.

Finally, it should be noted that the above were only several specific embodiments of the disclosure, the present invention is not limited to the above embodiments and has various transformable forms.

What is claimed is:

1. A continuous combustion production equipment for synthesizing ton-grade fullerenes, comprising: a gas supply and flow control system, a liquid supply and flow control system, a vaporization and preheating system, a combustion furnace, a combustor, a spray nozzle, an ignition system, a filter tank, a product collection system, a vacuum control system, a vacuum measuring and displaying unit and a circulation water cooling system, wherein the combustion furnace is placed vertically, on a wall of which is arranged a water-cooling interlayer and at least one viewing window, the combustion furnace is an all-in-one diffusion combustion furnace, an inner of the all-in-one diffusion combustion furnace is a three-stage diffusion structure;

the combustor is equipped with three gas passages respectively at an inner layer, a middle layer and an outer layer, cross sections of each one of the gas passages is a concentric circle, the gas passages are arranged as variable diameter passages, outlets of the gas passages are not in a same cross section; the combustor is equipped with a water-cooling interlayer;

the spray nozzle is arranged at an inner side of the combustion furnace, an ejection direction of the spray nozzle is pointed at a flame, a flowmeter in the gas supply and flow control system is configured for controlling a flux of gas raw materials, a constant flow pump in the liquid supply and flow control system is configured for controlling a flux of liquid raw materials; raw material supply lines in the gas supply and flow control system and the liquid supply and flow control system are heated with heating components, a heating temperature is controlled with a temperature controller in the vaporization and preheating system such that the gas raw materials and the liquid raw materials are preheated prior to being charged into the combustion furnace;

the ignition system is equipped with a sleeve, a boost circuit and two metal electrodes, the sleeve, together with the metal electrodes positioned inside the sleeve, extends into the combustion furnace, one side of each of the two metal electrodes is a tip, another side of each of the two metal electrodes is connected with a boost circuit;

the filter tank is placed horizontally, an inlet of the filter tank is connected with an outlet of the combustion furnace through an elbow pipe and a first valve, the filter tank is equipped with a filter cartridge and a product sweeping device, carbon ashes in the filter tank and on the filter cartridge are swept into the product collection system by the product sweeping device without changing a pressure of a reaction system;

the product collection system includes product collection tanks and a bag collection device, the product collection tanks are arranged under two ends of the filter tank, with one of the product collection tanks at a left end and another at a right end, a second valve is arranged between each of the product collection tanks and the filter tank, the product collection tanks are equipped with ports, each of which has a switch and is used for transferring products to the bag collection device; a bottom of the filter tank is connected with the product collection tanks, each of the product collection tanks is connected with a vacuum pump set through a pipeline and the bag collection device, a third valve is arranged in the pipeline;

the product sweeping device is equipped with a metal hoop, a plane of the metal hoop is parallel to an end cap of the filter tank, the metal hoop is surrounded with brushes made of copper wires, an electric motor arranged outside the filter tank controls a front-to-back motion of the metal hoop in the filter tank by means of gears and screws;

a fourth valve in communication with air is arranged in the pipeline of the vacuum pump set in the vacuum control system; an outlet of the filter tank is connected with the vacuum pump set through the pipeline, the fourth valve is arranged in the pipeline; the filter tank is connected with the combustion furnace and the vacuum pump set in a same way; the combustion furnace, the filter tank and the product collection tanks are connected with the vacuum measuring and displaying unit, the vacuum measuring and displaying unit is used for monitoring a pressure in the combustion furnace, a pressure in the filter tank and a pressure in the product collection tanks;

the circulation water cooling system is connected with the combustion furnace and the vacuum pump set, and is used for circularly supplying cooling water to the combustion furnace and the vacuum pump set.

2. The continuous combustion production equipment for synthesizing ton-grade fullerenes of claim 1, wherein the gas raw materials are a gas fuel and an oxidizing agent gas, the liquid raw materials are various hydrocarbons or mixtures thereof.

3. The continuous combustion production equipment for synthesizing ton-grade fullerenes of claim 2, wherein the gas fuel is one selected from the group consisting of acetylene, methane, and natural gas, and wherein the hydrocarbon is one selected from the group consisting of benzene, cyclopentadiene, and coal tar.

4. The continuous combustion production equipment for synthesizing ton-grade fullerenes of claim 1, wherein the fullerenes include fullerenes contained in the carbon ashes.

5. The continuous combustion production equipment for synthesizing ton-grade fullerenes of claim 4, wherein the fullerenes are C70, C84 fullerenes and derivatives thereof as well as a bowlic compounds or open-cage fullerenes which are intermediates of fullerene reaction.

6. The continuous combustion production equipment for synthesizing ton-grade fullerenes of claim 1, wherein the three-stage diffusion structure inside the combustion furnace refers to a three-stage variable diameter structure with an inner diameter increasing progressively, which was built up with lining thermal insulation materials of different thicknesses.

7. The continuous combustion production equipment for synthesizing ton-grade fullerenes of claim 1, wherein the combustor extends into the combustion furnace through a top cover, and a center line of the combustor coincides with a center line of the combustion furnace, a direction of the flame during combustion is in line with a flow direction of the gas raw materials.

8. The continuous combustion production equipment for synthesizing ton-grade fullerenes of claim 1, comprising at least two of the filter tank, the at least two of the filter tank are switched to achieve continuous production, the fourth valve in communication with air arranged on the pipeline of the vacuum pump set of each vacuum control system controls a pressure inside the combustion furnace.

9. A continuous combustion production process for synthesizing ton-grade fullerenes, which is performed by the equipment of claim 1, comprising:

1) opening one of the three gas passages for supplying gas fuels, adjusting a flux by the flowmeter, placing the tip of each of the metal electrodes of the ignition system near the outlets of the gas passages in the combustor, opening the ignition system to ignite the gas fuels with an electric spark to generate the flame;

2) initiating the vacuum pump set, opening the third valve between the filter tank and the vacuum pump set and the first valve between the filter tank and the combustion furnace, meanwhile opening others of the three gas passages for supplying an oxidizing agent gas, adjusting a flux of the oxidizing agent gas by a flowmeter, initiating the circulation water cooling system;
3) opening the raw material supply lines in the gas supply and flow control system for supplying the liquid raw materials, adjusting a flux by the constant flow pump, charging the liquid raw materials into the heating components in the vaporization and preheating system to heat and vaporize the liquid raw materials, guiding vaporized liquid raw materials into the combustor through the raw material supply lines, and spraying the vaporized liquid raw materials into a combustion region to participate in combustion;
4) opening the raw material supply lines in the gas supply and flow control system for supplying the liquid raw materials, adjusting the flux by the constant flow pump, charging the liquid raw materials into the spray nozzle through the raw material supply lines, and spraying the liquid raw materials to the flame to participate in combustion;
5) adjusting a pressure of the equipment to keep it below 5000 Pa;
at an interval of every 2 to 4 hours, conducting the following steps successively:
6-1) initiating the electric motor outside the filter tank, driving the metal hoop to move front-to-back in the combustion furnace by means of the gears and the screws, sweeping the products in the filter tank into the product collection tanks under the filter tank;
6-2) closing the second valve between each of the product collection tanks under the filter tank and the filter tank, transferring the products in the product collection tanks to the bag collection device;
6-3) initiating the vacuum pump set connected with the product collection tanks to cause the pressure in the product collection tanks to be close to the pressure in the combustion furnace, closing the vacuum pump set;
6-4) opening the second valve between each of the product collection tanks under the filter tank and the filter tank;
after step 5), at an interval of every 2 to 4 hours, conducting the following steps successively:
7-1) closing the first valve between the filter tank and the combustion furnace and the third valve between the filter tank and the vacuum pump set;
7-2) transferring the products in the product collection tanks under the filter tank to the bag collection device;
7-3) initiating the vacuum pump set connected with the filter tank and the product collection tanks to cause the pressure in the product collection tanks to be close to the pressure in the combustion furnace, closing the vacuum pump set;
7-4) opening the first valve between the filter tank and the combustion furnace and the third valve between the filter tank and the vacuum pump set;
7-5) conducting operations in steps 7-1) to 7-4) on the filter tank successively.

10. The continuous combustion production process for synthesizing ton-grade fullerenes of claim 9, wherein in step 3), a setting temperature of the heating components is 200~500° C. higher than boiling points of the liquid raw materials.

11. A continuous combustion production process for synthesizing ton-grade fullerenes, which is performed by the equipment of claim 2, comprising:
1) opening one of the three gas passages for supplying gas fuels, adjusting a flux by the flowmeter, placing the tip of each of the metal electrodes of the ignition system near the outlets of the gas passages in the combustor, opening the ignition system to ignite the gas fuels with an electric spark to generate the flame;
2) initiating the vacuum pump set, opening the third valve between the filter tank and the vacuum pump set and the first valve between the filter tank and the combustion furnace, meanwhile opening others of the three gas passages for supplying an oxidizing agent gas, adjusting a flux of the oxidizing agent gas by a flowmeter, initiating the circulation water cooling system;
3) opening the raw material supply lines in the gas supply and flow control system for supplying the liquid raw materials, adjusting a flux by the constant flow pump, charging the liquid raw materials into the heating components in the vaporization and preheating system to heat and vaporize the liquid raw materials, guiding vaporized liquid raw materials into the combustor through the raw material supply lines, and spraying the vaporized liquid raw materials into a combustion region to participate in combustion;
4) opening the raw material supply lines in the gas supply and flow control system for supplying the liquid raw materials, adjusting the flux by the constant flow pump, charging the liquid raw materials into the spray nozzle through the raw material supply lines, and spraying the liquid raw materials to the flame to participate in combustion;
5) adjusting a pressure of the equipment to keep it below 5000 Pa;
at an interval of every 2 to 4 hours, conducting the following steps successively:
6-1) initiating the electric motor outside the filter tank, driving the metal hoop to move front-to-back in the combustion furnace by means of the gears and the screws, sweeping the products in the filter tank into the product collection tanks under the filter tank;
6-2) closing the second valve between each of the product collection tanks under the filter tank and the filter tank, transferring the products in the product collection tanks to the bag collection device;
6-3) initiating the vacuum pump set connected with the product collection tanks to cause the pressure in the product collection tanks to be close to the pressure in the combustion furnace, closing the vacuum pump set;
6-4) opening the second valve between each of the product collection tanks under the filter tank and the filter tank;
after step 5), at an interval of every 2 to 4 hours, conducting the following steps successively:
7-1) closing the first valve between the filter tank and the combustion furnace and the third valve between the filter tank and the vacuum pump set;
7-2) transferring the products in the product collection tanks under the filter tank to the bag collection device;
7-3) initiating the vacuum pump set connected with the filter tank and the product collection tanks to cause the pressure in the product collection tanks to be close to the pressure in the combustion furnace, closing the vacuum pump set;

7-4) opening the first valve between the filter tank and the combustion furnace and the third valve between the filter tank and the vacuum pump set;

7-5) conducting operations in steps 7-1) to 7-4) on the filter tank successively.

12. A continuous combustion production process for synthesizing ton-grade fullerenes, which is performed by the equipment of claim 3, comprising:

1) opening one of the three gas passages for supplying gas fuels, adjusting a flux by the flowmeter, placing the tip of each of the metal electrodes of the ignition system near the outlets of the gas passages in the combustor, opening the ignition system to ignite the gas fuels with an electric spark to generate the flame;

2) initiating the vacuum pump set, opening the third valve between the filter tank and the vacuum pump set and the first valve between the filter tank and the combustion furnace, meanwhile opening others of the three gas passages for supplying an oxidizing agent gas, adjusting a flux of the oxidizing agent gas by a flowmeter, initiating the circulation water cooling system;

3) opening the raw material supply lines in the gas supply and flow control system for supplying the liquid raw materials, adjusting a flux by the constant flow pump, charging the liquid raw materials into the heating components in the vaporization and preheating system to heat and vaporize the liquid raw materials, guiding vaporized liquid raw materials into the combustor through the raw material supply lines, and spraying the vaporized liquid raw materials into a combustion region to participate in combustion;

4) opening the raw material supply lines in the gas supply and flow control system for supplying the liquid raw materials, adjusting the flux by the constant flow pump, charging the liquid raw materials into the spray nozzle through the raw material supply lines, and spraying the liquid raw materials to the flame to participate in combustion;

5) adjusting a pressure of the equipment to keep it below 5000 Pa;

at an interval of every 2 to 4 hours, conducting the following steps successively:

6-1) initiating the electric motor outside the filter tank, driving the metal hoop to move front-to-back in the combustion furnace by means of the gears and the screws, sweeping the products in the filter tank into the product collection tanks under the filter tank;

6-2) closing the second valve between each of the product collection tanks under the filter tank and the filter tank, transferring the products in the product collection tanks to the bag collection device;

6-3) initiating the vacuum pump set connected with the product collection tanks to cause the pressure in the product collection tanks to be close to the pressure in the combustion furnace, closing the vacuum pump set;

6-4) opening the second valve between each of the product collection tanks under the filter tank and the filter tank;

after step 5), at an interval of every 2 to 4 hours, conducting the following steps successively:

7-1) closing the first valve between the filter tank and the combustion furnace and the third valve between the filter tank and the vacuum pump set;

7-2) transferring the products in the product collection tanks under the filter tank to the bag collection device;

7-3) initiating the vacuum pump set connected with the filter tank and the product collection tanks to cause the pressure in the product collection tanks to be close to the pressure in the combustion furnace, closing the vacuum pump set;

7-4) opening the first valve between the filter tank and the combustion furnace and the third valve between the filter tank and the vacuum pump set;

7-5) conducting operations in steps 7-1) to 7-4) on the filter tank successively.

13. A continuous combustion production process for synthesizing ton-grade fullerenes, which is performed by the equipment of claim 4, comprising:

1) opening one of the three gas passages for supplying gas fuels, adjusting a flux by the flowmeter, placing the tip of each of the metal electrodes of the ignition system near the outlets of the gas passages in the combustor, opening the ignition system to ignite the gas fuels with an electric spark to generate the flame;

2) initiating the vacuum pump set, opening the third valve between the filter tank and the vacuum pump set and the first valve between the filter tank and the combustion furnace, meanwhile opening others of the three gas passages for supplying an oxidizing agent gas, adjusting a flux of the oxidizing agent gas by a flowmeter, initiating the circulation water cooling system;

3) opening the raw material supply lines in the gas supply and flow control system for supplying the liquid raw materials, adjusting a flux by the constant flow pump, charging the liquid raw materials into the heating components in the vaporization and preheating system to heat and vaporize the liquid raw materials, guiding vaporized liquid raw materials into the combustor through the raw material supply lines, and spraying the vaporized liquid raw materials into a combustion region to participate in combustion;

4) opening the raw material supply lines in the gas supply and flow control system for supplying the liquid raw materials, adjusting the flux by the constant flow pump, charging the liquid raw materials into the spray nozzle through the raw material supply lines, and spraying the liquid raw materials to the flame to participate in combustion;

5) adjusting a pressure of the equipment to keep it below 5000 Pa;

at an interval of every 2 to 4 hours, conducting the following steps successively:

6-1) initiating the electric motor outside the filter tank, driving the metal hoop to move front-to-back in the combustion furnace by means of the gears and the screws, sweeping the products in the filter tank into the product collection tanks under the filter tank;

6-2) closing the second valve between each of the product collection tanks under the filter tank and the filter tank, transferring the products in the product collection tanks to the bag collection device;

6-3) initiating the vacuum pump set connected with the product collection tanks to cause the pressure in the product collection tanks to be close to the pressure in the combustion furnace, closing the vacuum pump set;

6-4) opening the second valve between each of the product collection tanks under the filter tank and the filter tank;

after step 5), at an interval of every 2 to 4 hours, conducting the following steps successively:

7-1) closing the first valve between the filter tank and the combustion furnace and the third valve between the filter tank and the vacuum pump set;

7-2) transferring the products in the product collection tanks under the filter tank to the bag collection device;
7-3) initiating the vacuum pump set connected with the filter tank and the product collection tanks to cause the pressure in the product collection tanks to be close to the pressure in the combustion furnace, closing the vacuum pump set;
7-4) opening the first valve between the filter tank and the combustion furnace and the third valve between the filter tank and the vacuum pump set;
7-5) conducting operations in steps 7-1) to 7-4) on the filter tank successively.

14. A continuous combustion production process for synthesizing ton-grade fullerenes, which is performed by the equipment of claim 5, comprising:
1) opening one of the three gas passages for supplying gas fuels, adjusting a flux by the flowmeter, placing the tip of each of the metal electrodes of the ignition system near the outlets of the gas passages in the combustor, opening the ignition system to ignite the gas fuels with an electric spark to generate the flame;
2) initiating the vacuum pump set, opening the third valve between the filter tank and the vacuum pump set and the first valve between the filter tank and the combustion furnace, meanwhile opening others of the three gas passages for supplying an oxidizing agent gas, adjusting a flux of the oxidizing agent gas by a flowmeter, initiating the circulation water cooling system;
3) opening the raw material supply lines in the gas supply and flow control system for supplying the liquid raw materials, adjusting a flux by the constant flow pump, charging the liquid raw materials into the heating components in the vaporization and preheating system to heat and vaporize the liquid raw materials, guiding vaporized liquid raw materials into the combustor through the raw material supply lines, and spraying the vaporized liquid raw materials into a combustion region to participate in combustion;
4) opening the raw material supply lines in the gas supply and flow control system for supplying the liquid raw materials, adjusting the flux by the constant flow pump, charging the liquid raw materials into the spray nozzle through the raw material supply lines, and spraying the liquid raw materials to the flame to participate in combustion;
5) adjusting a pressure of the equipment to keep it below 5000 Pa;
at an interval of every 2 to 4 hours, conducting the following steps successively:
6-1) initiating the electric motor outside the filter tank, driving the metal hoop to move front-to-back in the combustion furnace by means of the gears and the screws, sweeping the products in the filter tank into the product collection tanks under the filter tank;
6-2) closing the second valve between each of the product collection tanks under the filter tank and the filter tank, transferring the products in the product collection tanks to the bag collection device;
6-3) initiating the vacuum pump set connected with the product collection tanks to cause the pressure in the product collection tanks to be close to the pressure in the combustion furnace, closing the vacuum pump set;
6-4) opening the second valve between each of the product collection tanks under the filter tank and the filter tank;
after step 5), at an interval of every 2 to 4 hours, conducting the following steps successively:

7-1) closing the first valve between the filter tank and the combustion furnace and the third valve between the filter tank and the vacuum pump set;
7-2) transferring the products in the product collection tanks under the filter tank to the bag collection device;
7-3) initiating the vacuum pump set connected with the filter tank and the product collection tanks to cause the pressure in the product collection tanks to be close to the pressure in the combustion furnace, closing the vacuum pump set;
7-4) opening the first valve between the filter tank and the combustion furnace and the third valve between the filter tank and the vacuum pump set;
7-5) conducting operations in steps 7-1) to 7-4) on the filter tank successively.

15. A continuous combustion production process for synthesizing ton-grade fullerenes, which is performed by the equipment of claim 6, comprising:
1) opening one of the three gas passages for supplying gas fuels, adjusting a flux by the flowmeter, placing the tip of each of the metal electrodes of the ignition system near the outlets of the gas passages in the combustor, opening the ignition system to ignite the gas fuels with an electric spark to generate the flame;
2) initiating the vacuum pump set, opening the third valve between the filter tank and the vacuum pump set and the first valve between the filter tank and the combustion furnace, meanwhile opening others of the three gas passages for supplying an oxidizing agent gas, adjusting a flux of the oxidizing agent gas by a flowmeter, initiating the circulation water cooling system;
3) opening the raw material supply lines in the gas supply and flow control system for supplying the liquid raw materials, adjusting a flux by the constant flow pump, charging the liquid raw materials into the heating components in the vaporization and preheating system to heat and vaporize the liquid raw materials, guiding vaporized liquid raw materials into the combustor through the raw material supply lines, and spraying the vaporized liquid raw materials into a combustion region to participate in combustion;
4) opening the raw material supply lines in the gas supply and flow control system for supplying the liquid raw materials, adjusting the flux by the constant flow pump, charging the liquid raw materials into the spray nozzle through the raw material supply lines, and spraying the liquid raw materials to the flame to participate in combustion;
5) adjusting a pressure of the equipment to keep it below 5000 Pa;
at an interval of every 2 to 4 hours, conducting the following steps successively:
6-1) initiating the electric motor outside the filter tank, driving the metal hoop to move front-to-back in the combustion furnace by means of the gears and the screws, sweeping the products in the filter tank into the product collection tanks under the filter tank;
6-2) closing the second valve between each of the product collection tanks under the filter tank and the filter tank, transferring the products in the product collection tanks to the bag collection device;
6-3) initiating the vacuum pump set connected with the product collection tanks to cause the pressure in the product collection tanks to be close to the pressure in the combustion furnace, closing the vacuum pump set;

6-4) opening the second valve between each of the product collection tanks under the filter tank and the filter tank;

after step 5), at an interval of every 2 to 4 hours, conducting the following steps successively:

7-1) closing the first valve between the filter tank and the combustion furnace and the third valve between the filter tank and the vacuum pump set;

7-2) transferring the products in the product collection tanks under the filter tank to the bag collection device;

7-3) initiating the vacuum pump set connected with the filter tank and the product collection tanks to cause the pressure in the product collection tanks to be close to the pressure in the combustion furnace, closing the vacuum pump set;

7-4) opening the first valve between the filter tank and the combustion furnace and the third valve between the filter tank and the vacuum pump set;

7-5) conducting operations in steps 7-1) to 7-4) on the filter tank successively.

16. A continuous combustion production process for synthesizing ton-grade fullerenes, which is performed by the equipment of claim 7, comprising:

1) opening one of the three gas passages for supplying gas fuels, adjusting a flux by the flowmeter, placing the tip of each of the metal electrodes of the ignition system near the outlets of the gas passages in the combustor, opening the ignition system to ignite the gas fuels with an electric spark to generate the flame;

2) initiating the vacuum pump set, opening the third valve between the filter tank and the vacuum pump set and the first valve between the filter tank and the combustion furnace, meanwhile opening others of the three gas passages for supplying an oxidizing agent gas, adjusting a flux of the oxidizing agent gas by a flowmeter, initiating the circulation water cooling system;

3) opening the raw material supply lines in the gas supply and flow control system for supplying the liquid raw materials, adjusting a flux by the constant flow pump, charging the liquid raw materials into the heating components in the vaporization and preheating system to heat and vaporize the liquid raw materials, guiding vaporized liquid raw materials into the combustor through the raw material supply lines, and spraying the vaporized liquid raw materials into a combustion region to participate in combustion;

4) opening the raw material supply lines in the gas supply and flow control system for supplying the liquid raw materials, adjusting the flux by the constant flow pump, charging the liquid raw materials into the spray nozzle through the raw material supply lines, and spraying the liquid raw materials to the flame to participate in combustion;

5) adjusting a pressure of the equipment to keep it below 5000 Pa;

at an interval of every 2 to 4 hours, conducting the following steps successively:

6-1) initiating the electric motor outside the filter tank, driving the metal hoop to move front-to-back in the combustion furnace by means of the gears and the screws, sweeping the products in the filter tank into the product collection tanks under the filter tank;

6-2) closing the second valve between each of the product collection tanks under the filter tank and the filter tank, transferring the products in the product collection tanks to the bag collection device;

6-3) initiating the vacuum pump set connected with the product collection tanks to cause the pressure in the product collection tanks to be close to the pressure in the combustion furnace, closing the vacuum pump set;

6-4) opening the second valve between each of the product collection tanks under the filter tank and the filter tank;

after step 5), at an interval of every 2 to 4 hours, conducting the following steps successively:

7-1) closing the first valve between the filter tank and the combustion furnace and the third valve between the filter tank and the vacuum pump set;

7-2) transferring the products in the product collection tanks under the filter tank to the bag collection device;

7-3) initiating the vacuum pump set connected with the filter tank and the product collection tanks to cause the pressure in the product collection tanks to be close to the pressure in the combustion furnace, closing the vacuum pump set;

7-4) opening the first valve between the filter tank and the combustion furnace and the third valve between the filter tank and the vacuum pump set;

7-5) conducting operations in steps 7-1) to 7-4) on the filter tank successively.

17. A continuous combustion production process for synthesizing ton-grade fullerenes, which is performed by the equipment of claim 8, comprising:

1) opening one of the three gas passages for supplying gas fuels, adjusting a flux by the flowmeter, placing the tip of each of the metal electrodes of the ignition system near the outlets of the gas passages in the combustor, opening the ignition system to ignite the gas fuels with an electric spark to generate the flame;

2) initiating the vacuum pump set, opening the third valve between the filter tank and the vacuum pump set and the first valve between the filter tank and the combustion furnace, meanwhile opening others of the three gas passages for supplying an oxidizing agent gas, adjusting a flux of the oxidizing agent gas by a flowmeter, initiating the circulation water cooling system;

3) opening the raw material supply lines in the gas supply and flow control system for supplying the liquid raw materials, adjusting a flux by the constant flow pump, charging the liquid raw materials into the heating components in the vaporization and preheating system to heat and vaporize the liquid raw materials, guiding vaporized liquid raw materials into the combustor through the raw material supply lines, and spraying the vaporized liquid raw materials into a combustion region to participate in combustion;

4) opening the raw material supply lines in the gas supply and flow control system for supplying the liquid raw materials, adjusting the flux by the constant flow pump, charging the liquid raw materials into the spray nozzle through the raw material supply lines, and spraying the liquid raw materials to the flame to participate in combustion;

5) adjusting a pressure of the equipment to keep it below 5000 Pa;

at an interval of every 2 to 4 hours, conducting the following steps successively:

6-1) initiating the electric motor outside the filter tank, driving the metal hoop to move front-to-back in the combustion furnace by means of the gears and the screws, sweeping the products in the filter tank into the product collection tanks under the filter tank;

6-2) closing the second valve between each of the product collection tanks under the filter tank and the filter tank, transferring the products in the product collection tanks to the bag collection device;
6-3) initiating the vacuum pump set connected with the product collection tanks to cause the pressure in the product collection tanks to be close to the pressure in the combustion furnace, closing the vacuum pump set;
6-4) opening the second valve between each of the product collection tanks under the filter tank and the filter tank;

after step 5), at an interval of every 2 to 4 hours, conducting the following steps successively:
7-1) closing the first valve between the filter tank and the combustion furnace and the third valve between the filter tank and the vacuum pump set;
7-2) transferring the products in the product collection tanks under the filter tank to the bag collection device;
7-3) initiating the vacuum pump set connected with the filter tank and the product collection tanks to cause the pressure in the product collection tanks to be close to the pressure in the combustion furnace, closing the vacuum pump set;
7-4) opening the first valve between the filter tank and the combustion furnace and the third valve between the filter tank and the vacuum pump set;
7-5) conducting operations in steps 7-1) to 7-4) on the filter tank successively.

18. The continuous combustion production process for synthesizing ton-grade fullerenes of claim 11, wherein in step 3), a setting temperature of the heating components is 200~500° C. higher than boiling points of the liquid raw materials.

19. The continuous combustion production process for synthesizing ton-grade fullerenes of claim 12, wherein in step 3), a setting temperature of the heating components is 200~500° C. higher than boiling points of the liquid raw materials.

20. The continuous combustion production process for synthesizing ton-grade fullerenes of claim 13, wherein in step 3), a setting temperature of the heating components is 200~500° C. higher than boiling points of the liquid raw materials.

* * * * *